Dec. 20, 1955
W. E. SMITH
2,727,758
EXTENSIBLE TRAILER FOR CARRYING POLES
Filed Feb. 24, 1953
3 Sheets-Sheet 1
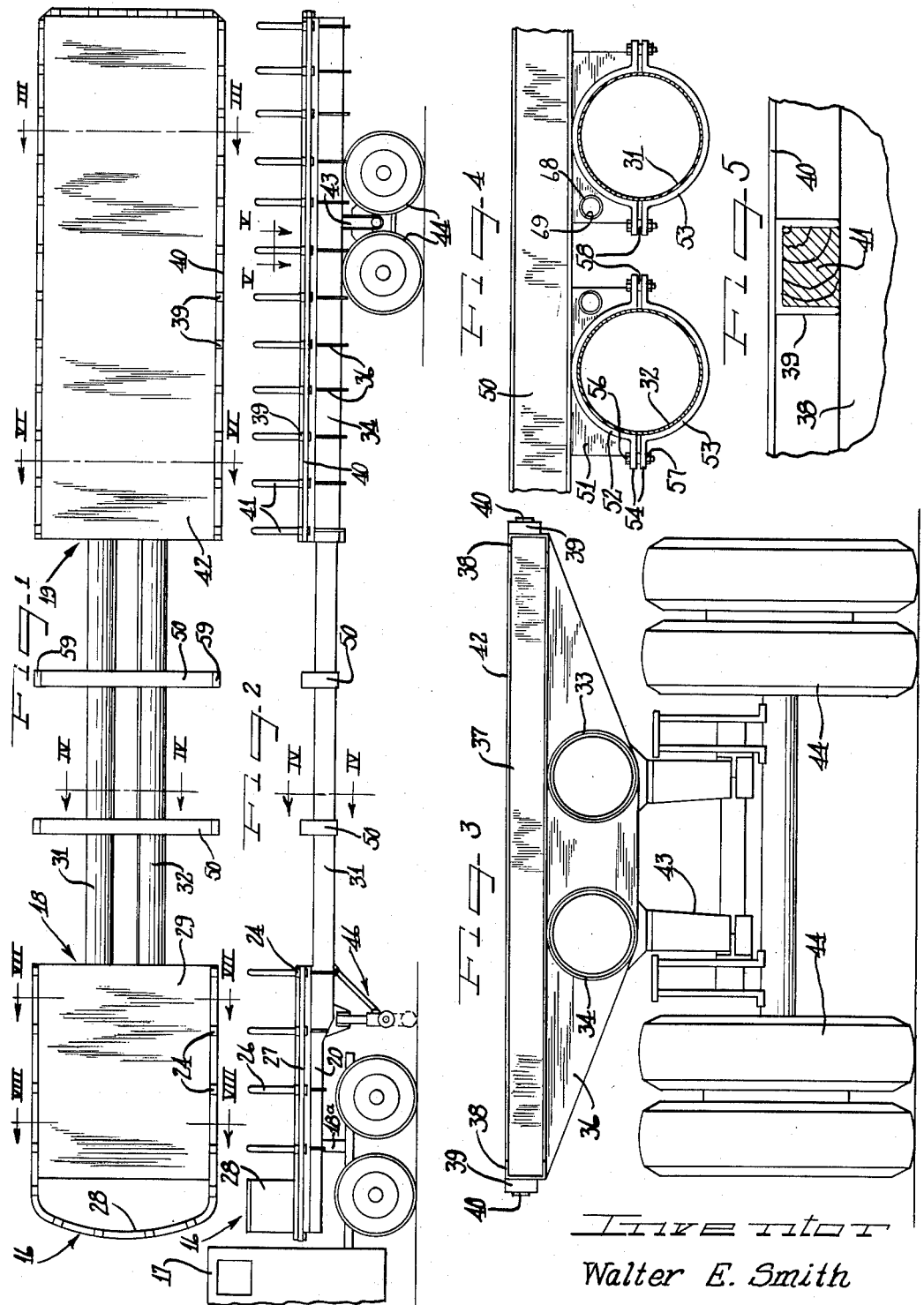
Inventor
Walter E. Smith

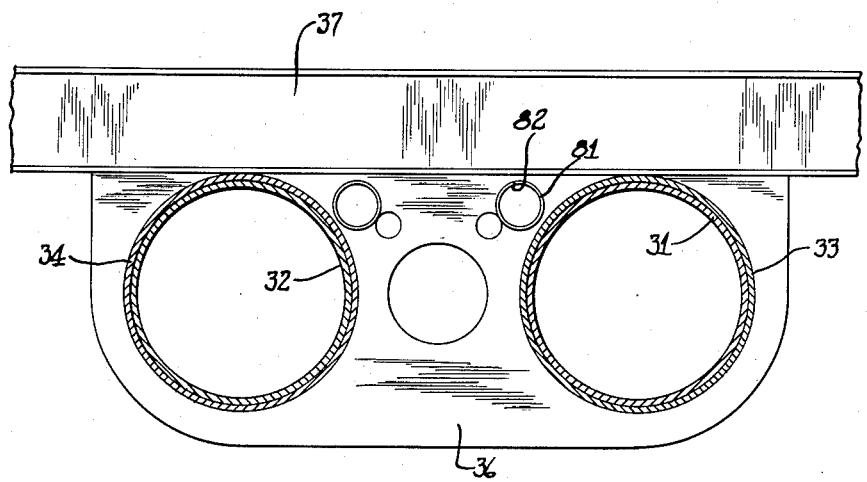
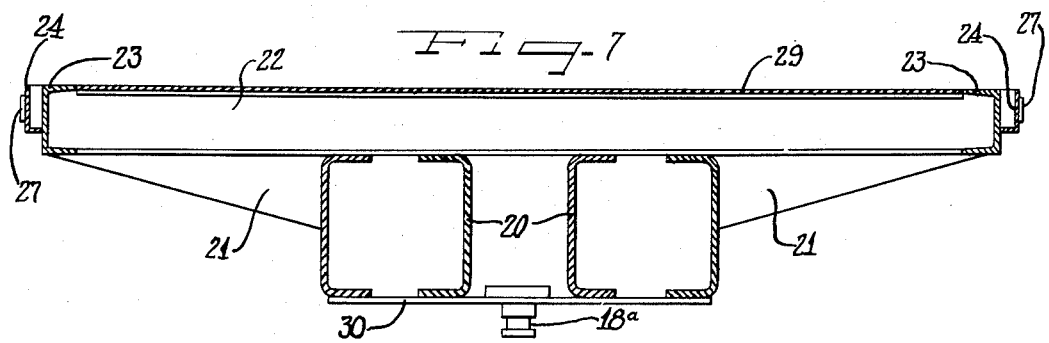
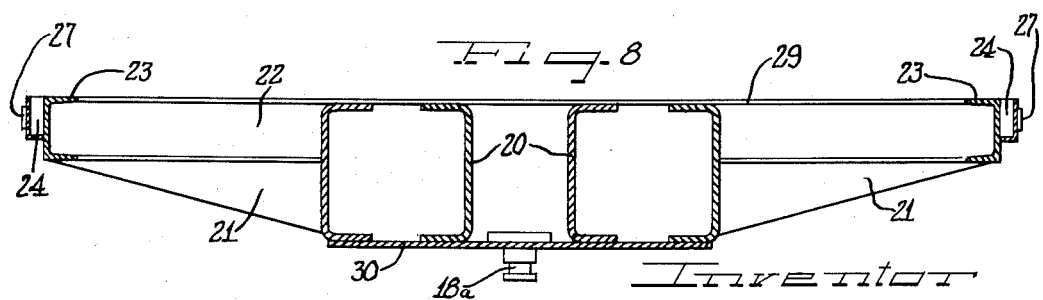

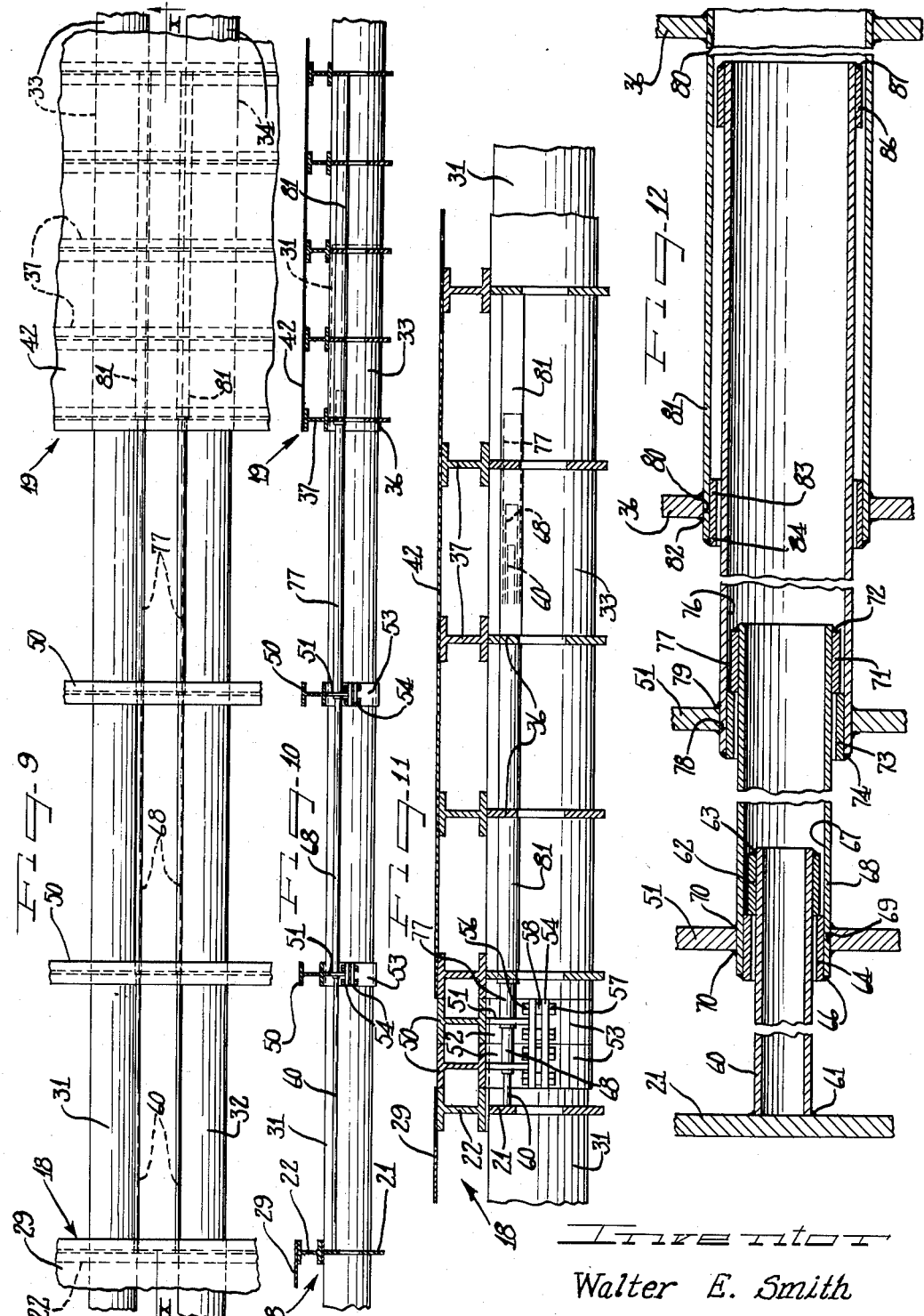

United States Patent Office 2,727,758
Patented Dec. 20, 1955

2,727,758

EXTENSIBLE TRAILER FOR CARRYING POLES

Walter E. Smith, Chicago, Ill., assignor to Central Steel & Wire Company, Chicago, Ill., a corporation of Illinois Application February 24, 1953, Serial No. 338,220

8 Claims. (Cl. 280—34)

This invention relates generally to trailer apparatus and more particularly to an extensible platform apparatus comprising front and rear telescopically related members having a movable platform member therebetween and positioning means connected to the movable platform member and to each of the telescopically related members to medially space the movable platform member upon separation of the front and rear members.

In the transportation of poles, metal forms and other elongated objects, it is frequently desirable that a trailer apparatus be provided which can be selectively adjusted to accommodate elongated objects of varying length.

Although extensible trailer apparatus has heretofore been provided wherein front and rear platform sections are telescopically related, it will be evident that separation of the front and rear platform sections leaves a considerable medial space in which no vertical support is provided for the elongated objects carried on the trailer apparatus.

Even if support members are provided for the purpose of inserting same into the space between the separated front and rear platform sections of a trailer, there is a particular problem presented in locating the supplementary platform sections in proper longitudinally spaced relation so as to afford proper vertical support for the elongated objects carried on the trailer apparatus.

According to the general principles of the present invention, one or more movable cross-beams or supplemental platform sections can be medially located between front and rear platform sections of an extensible trailer apparatus and the cross beams cooperate with the positioning mechanism to be automatically spaced in the separation between the front and rear platform sections in response to relative movement therebetween.

It is an object of the present invention, therefore, to provide a trailer apparatus for elongated objects which overcomes the deficiencies of the prior art.

Another object of the present invention is to provide an improved trailer apparatus for elongated objects wherein medial positioning means are provided to afford vertical support for elongated objects carried on a trailer having front and rear platform sections.

Yet another object of the present invention is to provide a trailer apparatus having extensible front and rear sections and including medial support members which are automatically spaced upon separation of the front and rear sections.

Many other features, advantages and additional objects of the present invention will become manifest to those versed in the art upon making reference to the detailed description which follows and the accompanying sheets of drawings showing an illustrative embodiment of a trailer apparatus incorporating the principles of the present invention.

On the drawings:

Figure 1 is a plan view, somewhat diagrammatic in nature, of a pole trailer provided in accordance with the principles of the present invention;

Figure 2 is an elevational view of the trailer of Figure 1 and showing a diagrammatic fragmentary view of a tractor to be connected to the trailer;

Figure 3 is a somewhat enlarged end sectional view of the trailer shown in Figures 1 and 2 taken on line III—III of Figure 1;

Figure 4 is a cross-sectional view with parts shown in elevation and which is fragmentary in part taken substantially on line IV—IV of Figure 1;

Figure 5 is an enlarged fragmentary cross-sectional view taken substantially on line V—V of Figure 2;

Figure 6 is an enlarged fragmentary cross-sectional view taken on line VI—VI of Figure 1;

Figure 7 is an enlarged cross-sectional view taken on line VII—VII of Figure 1;

Figure 8 is a cross-sectional view taken on line VIII—VIII of Figure 1;

Figure 9 is an enlarged fragmentary plan view similar in orientation to Figure 1 but showing additional details of construction of the trailer apparatus;

Figure 10 is a fragmentary cross-sectional view taken on line X—X of Figure 9 and showing the trailer apparatus in open position;

Figure 11 is an enlarged view similar to Figure 10 but showing the trailer in closed position; and Figure 12 is an enlarged fragmentary cross-sectional view showing additional details of construction of a positioning apparatus provided in accordance with the principles of the present invention.

As shown in the drawings:

The trailer of the present invention is indicated generally by the reference character 16 and is adapted to be pulled by a tractor 17, a tractor hitch 18a (Figures 2, 7 and 8) being provided to effect a conventional swivel connection between the trailer 16 and the tractor 17.

The trailer 16 comprises front and rear platform sections indicated generally at 18 and 19, respectively.

Referring first of all to Figures 1, 2, 4, 7 and 8, it may be noted that the front platform section comprises a spider support frame including longitudinally extending channels indicated at 20 and firmly connected to a row of longitudinally spaced brackets or fins 21 each carrying a cross beam 22.

The peripheral edge of the front frame section 18 is bounded by a channel member 23 which, in turn, carries a plurality of stake pockets 24 each receiving an upstanding wooden stake indicated at 26.

A rub rail 27 extends around the frame section and is attached to the outside surface of each of the stake pockets 24.

At the front end of the platform section 18 an upstanding skirt 28 is provided and the cross beams 22 are covered on their upper sides by a platform floor 29. A support plate 30 is connected on the lowermost sides of the channels 20 and the trailer coupling or trunnion 18a previously referred to is supported thereby to effect a coupling connection between the tractor 17 and the platform section 18 of the trailer 16.

Extending rearwardly from the front platform section 18 and in projecting relationship with respect thereto are a pair of transversely spaced tubular spider support members indicated at 31 and 32 respectively. The support members 31 and 32 are adjustably mated with the rear platform section 19 so as to facilitate extension of the front and rear platform sections 18 and 19.

Referring now to Figures 1, 2, 3 and 6, additional details of construction of the rear platform section will be described.

A pair of transversely spaced longitudinally extending tubular spider support members indicated at 33 and 34 carry in firm assembly therewith a row of longitudinally spaced support brackets or fins 36 each of which in turn carries a cross beam 37. The construction of the rear platform section 19 is similar to that of the front platform section 18 and includes side channels indicated at 38 carrying a plurality of spaced stake pockets 39 bounded by a rub rail 40. An upstanding stake 41 is received in each of the stake pockets 39.

A platform floor 42 covers the upper sides of the cross beams 27 and means are provided underlying the support members 33 and 34 to form an axle assembly indicated generally at 43 having wheels 44 on opposite ends thereof to provide wheel trucks for the rear platform section 19.

The front platform section 18 also carries an adjustable landing gear indicated generally at 46 which can be moved out of ground engaging position as shown in full lines in Figure 2 when the trailer is connected to a tractor but which can be adjusted to the dotted line position of Figure 2 if the trailer 16 is disconnected from a pulling tractor.

The tubular support members 33 and 34 of the rear platform section 19 have an inner diameter which is sufficiently great to telescopically receive the tubular support members 31 and 32 of the front platform section 18, thereby facilitating adjustable mating relation between the front and rear platform sections.

In accordance with the principles of the present invention, automatically positioned medial support means are provided between the front and rear platform sections. As will be noted upon referring to Figures 1, 2 and 4, a plurality of movable cross beams 50 are provided each of the cross beams being carried by a support fin 51 which in turn carries one half of a clamp bracket indicated at 52. The clamp bracket 52 is complemental in shape to the peripheral contour of the support members 31 and 32 and mates with a bracket member 53 positioned in underlying relationship to each of the support members 31 and 32 immediately subjacent the bracket members 52.

The bracket members 52 and 53 include radially outwardly projecting flanges 54 suitably apertured to receive fastening bolts 56. By turning a nut 57 on each of the fastening bolts 56, the brackets 52 and 53 can be drawn together radially inwardly with respect to the tubular support members 31 and 32.

Although it will be understood that the brackets 52 and 53 can be drawn tightly together so as to place the cross beams 50 in firm assembly with the support members 31 and 32, the cross beams 50 can be movably mounted relative to the support members 31 and 32 by interposing a spacer 58 between the flanges 54, thereby permitting sliding movement between the support members 31 and 32 and the bracket members 52 and 53.

As indicated in Figure 1, each of the cross beams 50 may be provided with an appropriate stake pocket 59 on the ends thereof.

In accordance with the principles of the present invention, positioning means are provided to automatically space the cross beams 50 in longitudinally spaced alignment in the separation between the front and rear platform sections 18 and 19 and such spacing is effected automatically in response to relative movement between the front and rear platform sections 18 and 19.

The details of construction of the positioning means are clearly shown in Figures 9-12.

As shown in Figure 12 a first positioning member which takes the form of a rod or tubular member 60 extends longitudinally away from the endmost bracket or support fin 21 on the front platform section 18. The tubular member 60 is placed in firm assembly with the fin 21 by means of a fastening which may take the form of a weld 61.

At the other end of the tubular member 60, a stop ring 62 is welded as in firm assembly as shown at 63 and abuttingly engages a cooperating stop ring 64 welded as at 66 on the inside bore 67 of a second positioning member which takes the form of a rod or a tubular member 68 firmly assembled to the bracket or support fin 51 associated with one of the cross beams 50. In order to facilitate firm assembly of the cross beam 50 support fin 51 with the tubular member 68, the fin 51 is provided with an aperture 69 receiving the tubular member 68 and the two components are placed in firm assembly by means of welds indicated at 70.

At the other end of the tubular member 68, a stop ring 71 is welded as at 72 and engagingly abuts a cooperating stop ring 73 welded as at 74 to the inside bore 76 of a positioning member which takes the form of a rod or a tubular member 77 received in an aperture 78 formed in the support fin 51 of the second cross beam 50 and welded thereto as at 79.

Each of the brackets or support fins 36 provided on the rear frame section 19 is apertured as at 80 to receive a tubular housing 81, welds being provided as at 82 to place the housing 81 in firm assembly with the support fins 36.

At the open end of the tubular housing 81 adjacent the forwardmost end of the rear platform section 19, a stop ring 83 is welded as at 84 to engage a stop ring 86 welded as at 87 to the end of the tubular member 77.

From the description given, it will be evident that the positioning means of the present invention provides a plurality of adjustably mated elongated members and in the illustrative embodiment shown the positioning means takes the form of a telescopic assembly having a plurality of telescoping units corresponding in number to the number of cross beams 50 provided between the front and rear platform sections 18 and 19.

As shown in Figure 9, there are preferably provided two separate positioning means, one of the telescopic assemblies being assembled to the trailer apparatus adjacent the support member 31 and the other of the telescopic assemblies being installed in the trailer apparatus adjacent the support member 32.

In operation, the functioning of the various components will be carried out in the manner clearly shown in Figures 10 and 11.

The closed position of the front and rear platform sections 18 and 19 is shown. In the closed position of Figure 11 all of the tubular members 60, 68, 77 and 81 are telescopically nested. Moreover, the cross beams 22, 37 and 50 at the respective ends of the front and rear platform sections 18 and 19 and therebetween are closely spaced longitudinally in abutting relationship so that a continuous platform surface is provided by the floor members 29, 42 and the upper sides of the cross beams 50.

As soon as the front and rear platform sections 18 and 19 are extended and relative separation movement occurs therebetween, relative movement will also occur between the tubular member 60 connected in firm assembly with the front platform section 18 and the tubular housing 81 connected in firm assembly with the rear platform section 19 of each of the telescopic positioning assemblies. The tubular member 60 will be withdrawn from the tubular member 68 until the stop ring 62 engagingly abuts the stop ring 64 whereupon the cross beam 50 closest to the front platform section will be automatically spaced from the front platform section 18 by a distance corresponding to the linear longitudinal length of the tubular member 60.

Thereafter, further separation of the front and rear platform sections 18 and 19 will result in the withdrawal of the tubular member 68 from the tubular member 77 whereupon the stop ring 71 will abuttingly engage the stop ring 73 and the second cross beam 50 will be appropriately spaced in the separation between the platform sections.

It will be understood that as many cross beams and as many telescoping members may be provided between the front and rear platform sections as may be required in view of the contemplated use of the trailer apparatus, however, in each instance, the spacing of the cross beams 50 relative to one another and relative to the cross beams 22 and 37 at the ends of the front and rear platform sections 18 and 19 will be automatically determined in response to the separation movement.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. An extensible trailer, comprising, a wheel unit having a rear frame supported thereby, said frame comprising a longitudinally extending tubular means having a row of longitudinally spaced transversely extending brackets each carrying a cross beam in firm assembly therewith, a front frame comprising a row of longitudinally spaced transversely extending brackets each carrying a cross beam, and longitudinally extending tubular means connected to said brackets and including a projecting portion telescopically received in said tubular means of said rear frame, a landing gear connected to said front frame, and at least one cross beam movably supported by said front frame tubular means and positioned between said front and rear frames, said movable cross beam having positioning members connected thereto and having stop means engaging each of said frames, thereby to be automatically medially positioned between said frames upon separation thereof.

2. A trailer, comprising, front and rear platform sections having corresponding front and rear frames telescopically assembled to one another, to permit extension of said platform sections, a plurality of movable cross beams coextensive in width with said platform sections and interposed therebetween, a support fin for each cross beam slidably supported on one of said frames, a rod connected in firm assembly to each of said fins, each rod being successively telescopically related to an adjoining rod to provide an assembly having a plurality of telescoping units corresponding in number to said cross beams, and means connecting said assembly to said platform sections to adjustably space the movable cross beams in any separation between said platform sections.

3. A trailer, comprising, front and rear platform sections having underlying support members telescopically assembled to one another, said platform sections having a telescopic guide assembly therebetween including a plurality of telescoping support rods of smaller size than said first mentioned support members and extending between said platform sections, a plurality of transverse cross supports between said platform sections, there being a corresponding number of cross supports and telescoped units in said telescopic guide assembly, and a bracket support for each cross support slidably connected to the underlying support members of said platform sections and connected in firm assembly with a corresponding support rod of said guide assembly to automatically space the cross supports in response to separation between said platform sections.

4. A trailer, comprising, a first row of longitudinally spaced cross beams for supporting a front platform, a second row of longitudinally spaced cross beams for supporting a rear platform, front and rear longitudinally extending support members for each corresponding row of cross beams, said front and rear support members being telescopically assembled to one another to selectively separate the rows of cross beams upon extending the front and rear platforms longitudinally, a plurality of movable cross beams movably supported on one of said front and rear support members, all of said cross beams together providing coplanar support surfaces when in side-by-side relation or when in extended relation, and a telescoping assembly connected to said support members and having telescopically extensible members connected to each of said movable cross beams to adjustably space the movable cross beams between the front and rear platforms when they are extended into longitudinally spaced apart relation with respect to one another.

5. In an extensible trailer apparatus, a front platform section having a landing gear and a trailer coupling for attachment to a source of tractive power and a rear platform section having wheel trucks to support the trailer apparatus as a vehicle, one of said platform sections having a longitudinally projecting support means received in a mating support means carried by the other of said platform sections, whereby said front and rear sections may be adjustably extended in a longitudinal direction, a plurality of transverse cross beams movably supported on said projecting support means, and a positioning apparatus connected between said front and rear platform sections responsive to relative longitudinal movement between said platform sections and connected to said cross beams to adjustably space said cross beams longitudinally between said platform sections.

6. In a trailer apparatus as defined in claim 5, said positioning apparatus comprising a plurality of telescoping connecting members, one of said connecting members being firmly assembled to each corresponding cross beam.

7. In a trailer apparatus as defined in claim 5, said projecting support means and said support means each comprising telescoping cylindrical tubes.

8. In a wheeled trailer, a front frame having a trailer coupling for attachment to a source of tractive power, a rear frame having wheel trucks for movably supporting the trailer as a vehicle, extensible adjustably mated support members between said front and rear frames and a medial frame providing a support surface in coplanar relation to said front and rear support surfaces and movably supported on one of said support members, said medial frame having positioning members connected thereto extending towards each respective one of said front and rear frames, said positioning members and said front and rear frames having a stop engagement therebetween to intermediately position said medial frame between said front and rear frames upon separably extending the frames.

References Cited in the file of this patent

UNITED STATES PATENTS

| | | |
|---|---|---|
| 316,472 | Main | Apr. 8, 1885 |
| 667,927 | Weeks | Feb. 12, 1901 |
| 1,106,104 | Marx | Aug. 4, 1914 |
| 2,197,401 | Weber | Apr. 16, 1940 |